United States Patent
Andrianov et al.

(10) Patent No.: US 11,784,894 B2
(45) Date of Patent: Oct. 10, 2023

(54) METHODS AND APPARATUSES FOR VIRTUALIZED NETWORK FUNCTION COMPONENT LEVEL VIRTUALIZED RESOURCES PERFORMANCE MANAGEMENT COLLECTION

(71) Applicant: NOKIA SOLUTIONS AND NETWORKS, Espoo (FI)

(72) Inventors: Anatoly Andrianov, Schaumburg, IL (US); Yi Zhi Yao, Beijing (CN)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 565 days.

(21) Appl. No.: 16/326,459

(22) PCT Filed: Aug. 18, 2016

(86) PCT No.: PCT/US2016/047548
§ 371 (c)(1),
(2) Date: Feb. 19, 2019

(87) PCT Pub. No.: WO2018/034663
PCT Pub. Date: Feb. 22, 2018

(65) Prior Publication Data
US 2021/0288889 A1    Sep. 16, 2021

(51) Int. Cl.
*H04L 41/5009* (2022.01)
*G06F 9/455* (2018.01)
*H04L 41/5041* (2022.01)

(52) U.S. Cl.
CPC ...... *H04L 41/5009* (2013.01); *G06F 9/45533* (2013.01); *H04L 41/5041* (2013.01)

(58) Field of Classification Search
CPC ....... G06F 9/45558; G06F 2009/45595; G06F 9/45533; G06F 2009/4557; G06F 21/57; G06F 21/575; G06F 9/4856; G06F 9/5072; G06F 9/5077; G06F 2009/45562; G06F 2009/45591; H04L 67/10; H04L 41/5054; H04L 63/0218; H04L 63/0281; H04L 63/0428; H04L 63/08; H04L 63/0876;
(Continued)

(56) References Cited

U.S. PATENT DOCUMENTS 7,512,931 B2 * 3/2009 Schmit ...................... G06F 8/71
717/105
9,313,281 B1 * 4/2016 Lietz ........................ H04L 67/51
(Continued)

OTHER PUBLICATIONS

International Search Report and Written Opinion dated Dec. 28, 2016 corresponding to International Patent Application No. PCT/US2016/047548.
(Continued)

*Primary Examiner* — Ninos Donabed
(74) *Attorney, Agent, or Firm* — SQUIRE PATTON BOGGS (US) LLP

(57) ABSTRACT

Systems, methods, apparatuses, and computer program products for virtualized network function (VNF) component (VNFC) level performance management are provided. One method includes collecting virtualized resources measurements, identifying virtualized network function components that the virtualized resources measurements belong to, and associating the collected virtualized resources measurements with an application function (MF).

4 Claims, 4 Drawing Sheets

(58) Field of Classification Search
CPC . H04L 63/1441; H04L 9/0897; H04L 9/3234; H04L 9/3247; H04L 41/5009; H04L 41/5041
See application file for complete search history.

(56) References Cited

U.S. PATENT DOCUMENTS

| | | | | |
|---|---|---|---|---|
| 10,481,953 | B2* | 11/2019 | Iwashina | G06F 9/5077 |
| 2006/0282825 | A1* | 12/2006 | Taylor | G06F 9/5083 |
| | | | | 717/127 |
| 2009/0241108 | A1* | 9/2009 | Edwards | G06F 9/45558 |
| | | | | 718/1 |
| 2009/0300605 | A1* | 12/2009 | Edwards | G06F 9/45558 |
| | | | | 718/1 |
| 2010/0094143 | A1* | 4/2010 | Mahapatra | A61B 17/3401 |
| | | | | 604/246 |
| 2011/0119748 | A1* | 5/2011 | Edwards | G06F 9/45558 |
| | | | | 726/12 |
| 2013/0227114 | A1* | 8/2013 | Vasseur | H04L 41/044 |
| | | | | 709/224 |
| 2014/0180915 | A1* | 6/2014 | Montulli | H04L 51/08 |
| | | | | 705/40 |
| 2014/0201374 | A1 | 7/2014 | Ashwood-Smith et al. | |
| 2015/0120791 | A1* | 4/2015 | Gummaraju | G06F 9/45558 |
| | | | | 707/823 |
| 2015/0154039 | A1* | 6/2015 | Zada | G06F 11/3664 |
| | | | | 718/1 |
| 2016/0021024 | A1* | 1/2016 | Parikh | G06F 9/45558 |
| | | | | 709/226 |
| 2016/0057075 | A1* | 2/2016 | Parikh | H04L 47/76 |
| | | | | 709/226 |
| 2016/0094401 | A1* | 3/2016 | Anwar | G06F 11/3006 |
| | | | | 709/223 |
| 2016/0191345 | A1* | 6/2016 | Despotovic | H04L 67/63 |
| | | | | 709/226 |
| 2016/0353422 | A1* | 12/2016 | Vrzic | H04W 16/04 |
| 2016/0353465 | A1* | 12/2016 | Vrzic | H04L 41/5054 |
| 2016/0359682 | A1* | 12/2016 | Senarath | H04L 41/0896 |
| 2017/0019302 | A1* | 1/2017 | Lapiotis | H04L 41/0813 |
| 2017/0063927 | A1* | 3/2017 | Schultz | H04L 63/10 |
| 2017/0086118 | A1* | 3/2017 | Vrzic | H04W 36/26 |
| 2017/0134237 | A1* | 5/2017 | Yang | H04L 41/5009 |
| 2017/0140315 | A1* | 5/2017 | Cao | G06Q 10/06311 |
| 2017/0142206 | A1* | 5/2017 | Kodaypak | H04L 12/1407 |
| 2017/0201434 | A1* | 7/2017 | Liang | H04L 67/10 |
| 2017/0201569 | A1* | 7/2017 | Fu | G06F 8/60 |
| 2017/0272783 | A1* | 9/2017 | Bachmutsky | H04N 21/632 |
| 2017/0272792 | A1* | 9/2017 | Bachmutsky | H04N 21/4532 |
| 2017/0289060 | A1* | 10/2017 | Aftab | H04L 41/145 |
| 2018/0013656 | A1* | 1/2018 | Chen | H04W 24/02 |
| 2019/0073269 | A1* | 3/2019 | Chou | G06F 11/3409 |

OTHER PUBLICATIONS

Communication pursuant to Article 94(3) EPC issued in corresponding European Patent Application No. 16 913 610.8, dated Mar. 22, 2021.

First Examination Report issued in corresponding Indian Patent Application No. 201947009667 dated Jun. 1, 2021.

Feb. 27, 2020 Extended Search Report issued in European Patent Application No. 16913610.

* cited by examiner

METHODS AND APPARATUSES FOR VIRTUALIZED NETWORK FUNCTION COMPONENT LEVEL VIRTUALIZED RESOURCES PERFORMANCE MANAGEMENT COLLECTION

BACKGROUND

Field

Some embodiments may generally relate to network function virtualization (NFV) and virtualized network function (VNF) management. In particular, certain embodiments may relate to approaches (including methods, apparatuses and computer program products) for VNF component (VNFC) level performance management.

Description of the Related Art

Network functions virtualization (NFV) refers to a network architecture model that uses the technologies of information technology (IT) virtualization to virtualize entire classes of network node functions into building blocks that may connect, or chain together, to create communication services.

A virtualized network function (VNF) may be designed to consolidate and deliver the networking components necessary to support a full virtualized environment. A VNF may be comprised of one or more virtual machines running different software and processes, on top of standard high-volume servers, switches and storage, or even cloud computing infrastructure, instead of having custom hardware appliances for each network function. One example of a VNF may be a virtual session border controller deployed to protect a network without the typical cost and complexity of obtaining and installing physical units. Other examples include virtualized load balancers, firewalls, intrusion detection devices and WAN accelerators.

In an NFV environment, a VNF may take on the responsibility of handling specific network functions that run on one or more virtualized containers on top of Network Functions Virtualization Infrastructure (NFVI) or hardware networking infrastructure, such as routers, switches, etc. Individual virtualized network functions (VNFs) can be combined to form a so called Network Service to offer a full-scale networking communication service.

Virtual network functions (VNFs) came about as service providers attempted to accelerate deployment of new network services in order to advance their revenue and expansion plans. Since hardware-based devices limited their ability to achieve these goals, they looked to IT virtualization technologies and found that virtualized network functions helped accelerate service innovation and provisioning. As a result, several providers came together to create the Network Functions Virtualization industry specification (ETSI ISG NFV group) under the European Telecommunications Standards Institute (ETSI). ETSI ISG NFV has defined the basic requirements and architecture of network functions virtualization.

In NFV, virtualized network functions (VNF) are software implementations of network functions that can be deployed on a network function virtualization infrastructure (NFVI). NFVI is the totality of all hardware and software components that build the environment where VNFs are deployed and can span several locations.

Each VNF may be managed by a VNF manager (VNFM). A VNFM may, for example, determine specific resources needed by a certain VNF when a VNF is instantiated (i.e., built) or altered. The so-called NFV orchestrator (NFVO) is responsible for network service management. A network service is a composition of network functions and defined by its functional and behavioral specification. The NFVO's tasks include lifecycle management (including instantiation, scale-out/in, termination), performance management, and fault management of virtualized network services.

SUMMARY

One embodiment is directed to a method. The method may include collecting virtualized resources measurements, identifying virtualized network function components that the virtualized resources measurements belong to, and associating the collected virtualized resources measurements with an application function (MF).

In an embodiment, the associating of the collected virtualized resources measurements with the application function is performed based on a mapping declared in a template file (VNFD). In another embodiment, the associating of the collected virtualized resources measurements with the application function is performed based on proprietary knowledge. According to certain embodiments, the collecting of the virtualized resources measurements, the identifying of the virtualized network function components that the virtualized resources measurements belong to, and the associating of the collected virtualized resources measurements with an application function (MF), are all performed by the same entity. In other embodiments, the collecting of the virtualized resources measurements and the identifying of the virtualized network function components that the virtualized resources measurements belong to are performed by one entity, and the associating of the collected virtualized resources measurements with an application function (MF) is performed by another entity.

Another embodiment is directed to an apparatus that includes collecting means for collecting virtualized resources measurements, identifying means for identifying virtualized network function components that the virtualized resources measurements belong to, and associating means for associating the collected virtualized resources measurements with an application function (MF).

In an embodiment, the associating means for associating the collected virtualized resources measurements with an application function (MF) is performed based on a mapping declared in a template file (VNFD). In another embodiment, the associating means for associating the collected virtualized resources measurements with an application function (MF) is performed based on proprietary knowledge. According to certain embodiments, the collecting means for the collecting of the virtualized resources measurements, the identifying means for the identifying of the virtualized network function components that the virtualized resources measurements belong to, and the associating means for the associating of the collected virtualized resources measurements with an application function (MF), are all performed by the same entity. In other embodiments, the collecting means for the collecting of the virtualized resources measurements and the identifying means for the identifying of the virtualized network function components that the virtualized resources measurements belong to are performed by one entity, and the associating means for the associating of the collected virtualized resources measurements with an application function (MF) is performed by another entity.

Another embodiment is directed to an apparatus, which includes at least one processor and at least one memory including computer program code. The at least one memory and computer program code are configured, with the at least one processor, to cause the apparatus at least to collect virtualized resources measurements, identify virtualized network function components that the virtualized resources measurements belong to, and associate the collected virtualized resources measurements with an application function (MF).

In an embodiment, the at least one memory and computer program code are configured, with the at least one processor, to cause the apparatus at least to associate the collected virtualized resources measurements with the application function based on a mapping declared in a template file (VNFD). In another embodiment, the at least one memory and computer program code are configured, with the at least one processor, to cause the apparatus at least to associate the collected virtualized resources measurements with the application function based on proprietary knowledge. According to certain embodiments, the collecting of the virtualized resources measurements, the identifying of the virtualized network function components that the virtualized resources measurements belong to, and the associating of the collected virtualized resources measurements with an application function (MF), are all performed by the same entity. In other embodiments, the collecting of the virtualized resources measurements and the identifying of the virtualized network function components that the virtualized resources measurements belong to are performed by one entity, and the associating of the collected virtualized resources measurements with an application function (MF) is performed by another entity.

Another embodiment is directed to a method including reporting a virtualized resources utilization at Managed Element level as a performance counter, and reporting the virtualized resources utilization at Managed Function level as sub-counters.

In an embodiment, the virtualized resources utilization at Managed Function level is reported as performance counter.

Another embodiment is directed to an apparatus, which includes reporting means for reporting a virtualized resources utilization at Managed Element level as a performance counter, and reporting means for reporting the virtualized resources utilization at Managed Function level as sub-counters.

In an embodiment, the virtualized resources utilization at Managed Function level is reported as performance counter.

Another embodiment is directed to an apparatus including at least one processor and at least one memory including computer program code. The at least one memory and computer program code are configured, with the at least one processor, to cause the apparatus at least to report a virtualized resources utilization at Managed Element level as a performance counter, and report the virtualized resources utilization at Managed Function level as sub-counters.

In an embodiment, the virtualized resources utilization at Managed Function level is reported as performance counter.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for virtualized network function (VNF) component (VNFC) level performance management, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Figure 1:
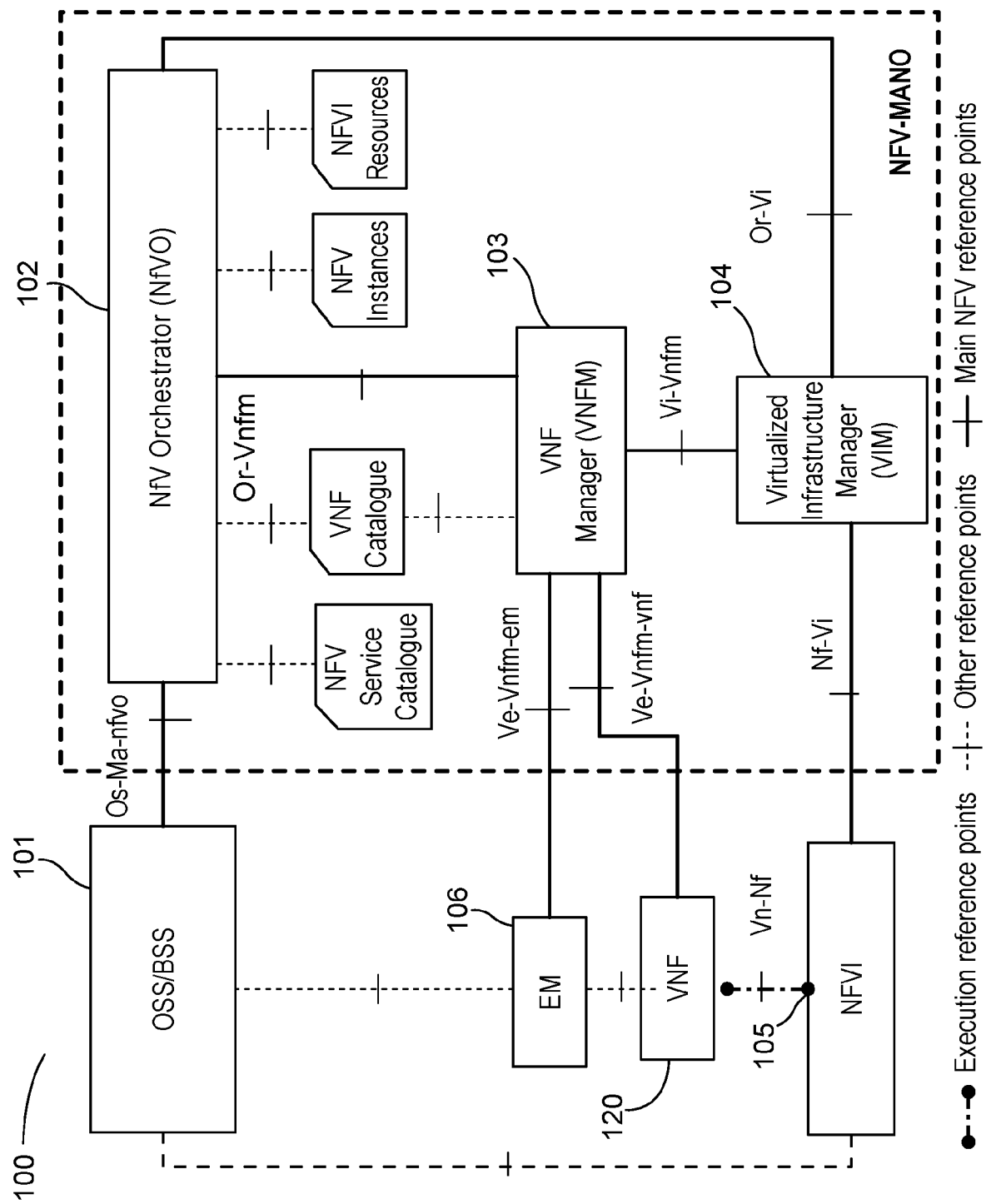
FIG. 1 illustrates a block diagram of a system depicting an example of a NFV management and organization (MANO) architecture framework with reference points.

FIG. 1 illustrates a block diagram of a system 100 depicting an example of a NFV management and organization (MANO) architecture framework with reference points. The system 100 may include an operations support system (OSS) 101 which comprises one or more entities or systems used by network providers to operate their systems. A Network Manager (NM) is one typical entity/system which may be part of OSS. Further, in the architecture framework system 100 of FIG. 1, OSS/BSS 101 and NFVO 102 may be configured to manage the network service, while element manager (EM) 106 and VNFM 103 may be configured to manage VNF 120.

In a NFV environment, Network Function Virtualization Infrastructure (NFVI) 105 holds the hardware resources needed to run a VNF, while a VNF 120 is designed to provide services. As an example, NFVO 102 may be responsible for on-boarding of new network services (NSs) and VNF packages, NS lifecycle management, global resource management, validation and authorization of NFVI resource requests. VNFM 103 may be responsible for overseeing the lifecycle management of VNF instances. Virtualized infrastructure manager (VIM) 104 may control and manage the NFVI compute, storage, and network resources.

NFVI 105 may be managed by the MANO domain exclusively, while VNF 120 may be managed by both MANO and the traditional management system, such as the element manager (EM) 106. The virtualization aspects of a VNF are managed by MANO (NFVO 102, VNFM 103, and VIM 104), while the application of the VNF 120 is managed by the element manager (EM) 106. A VNF 120 may be configured to provide services and these services can be managed by the element manager (EM) 106.

In certain embodiments, the Performance Management (PM) interface exposed by Virtualized Network Functions Manager (VNFM) to the Element Manager (EM) 106 may be used to provide the Virtualized Network Function (VNF) 120 and VNF Component (VNFC) level PM data related to the usage of Virtualized Resources (VR). In 3GPP systems, the Network Manager (NM) is the consumer of the PM data produced by the Network Elements (NE) or Network Functions. The Network Element (NE) and Network Function (NF) may be managed via ManagedElement (ME) and ManagedFunction (MF) models respectively. The NM needs to know which ME or MFs are impacted by the measurement results, and the degree they are impacted.

Additionally, in a multi-vendor network, it is important for the NM to know that measurement result data produced by equipment from one supplier is comparable to the measurement result data being produced by the equivalent equipment from another supplier. This is particularly important when analyzing data across the whole network. For post-processing of the measurement results in the NM, it is desirable that measurement results can be attributed to the correct measurement types with an indication of the impacted ME or MFs.

In 3GPP specifications, the PM data consumed by NM and the methods related to the collection, delivery and consumption of PM data are defined such that the control over collection of PM measurements (including PM jobs, etc. . . . ) is defined in the PM Integration Reference Point (IRP) family of 3GPP technical specification (TS) 32.41x. The transfer of PM data follows the principles defined in File Transfer (FT) IRP family of 3GPP TS 32.34x. The PM measurements are defined in relevant specifications (e.g., EUTRAN measurements in 3GPP TS 32.425, EPC measurements in 3GPP TS 32.426, IMS measurements in 3GPP TS 32.409). The measurement definitions follow the concepts defined in 3GPP TS 32.401 and formats/templates defined in 3GPP TS 32.404. The measurements can be defined at either Managed Function (MF) or Managed Element (ME) level. The application specific measurements are typically defined at MF level, the resource utilization specific measurements are typically defined at the ME level. The relevant MFs and MEs are defined in the 3GPP Network Resource Model (NRM). Each measurement definition in 3GPP TS has a Measurement Object Class (MOC) associated with it. The MOCs correspond to ME and MF defined in the NRM. For MOCs that are not present in the NRM the Private Object Classes (POC) are defined in 3GPP TS 32.404 as an exception (e.g., for Routing Area based measurements).

The PM data (related to Virtualized Resources utilization) provided by VNFM to the EM over Ve-Vnfm-Em reference point (according to the ETSI NFV GS IFA008), can be generated at either the VNF or VNFC level. Both data are extremely important for the EM. With NM, the situation is a bit more complex.

3GPP SA5 decided to maintain a clean separation between 3GPP NRM and ETSI NFV IM. There are no plans to define new classes in 3GPP NRM corresponding to the ETSI NFV defined VNF and VNFC. The exact mapping between 3GPP MF (corresponds to a standardized entity) and VNF (corresponds to a vendor's product implemented as virtualized function) is out of scope for standardization. 3GPP plans to add a new attribute to the Managed Element class containing the VNF instance ID as a pointer to the VNF realizing the ME. The VNF instance ID may be used to create a logical link between Managed Elements and VNFs (between 3GPP NRM and ETSI NFV IM).

Figure 2:
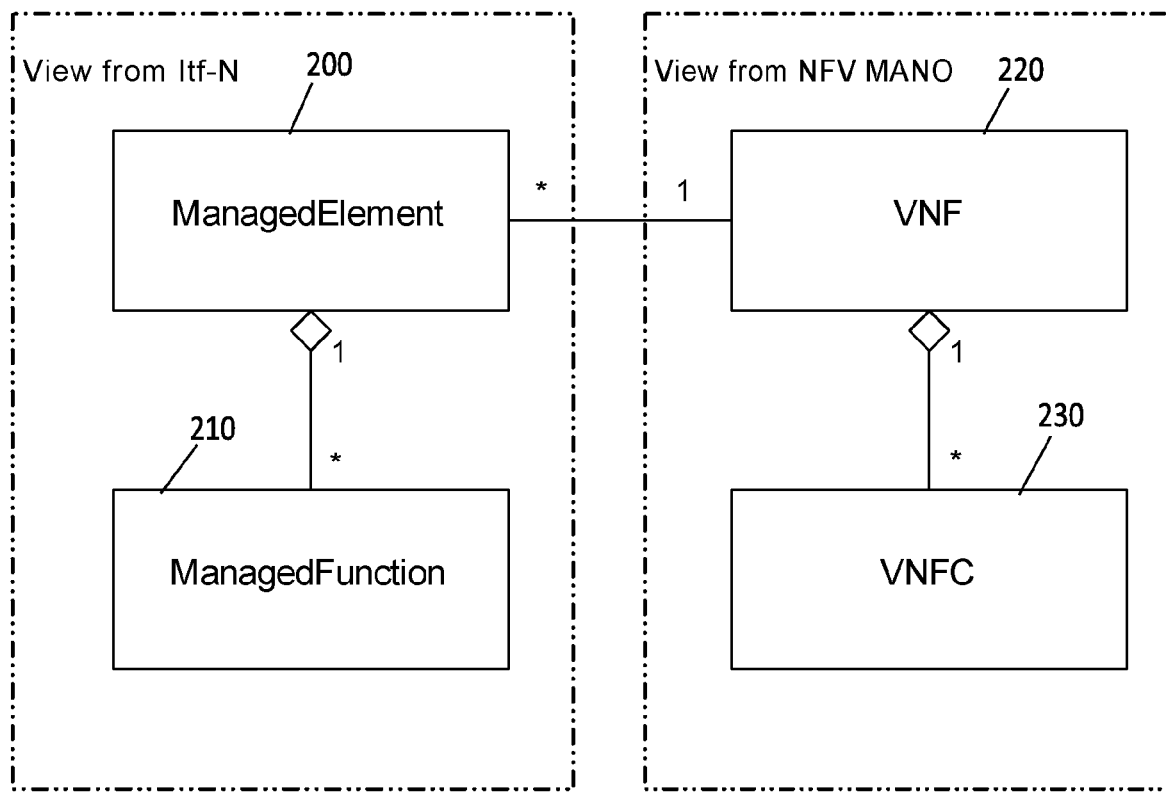
FIG. 2 illustrates a block diagram depicting the relationship of a managed element (ME), managed function (MF), virtualized network function (VNF), and VNF component (VNFC), according to an embodiment.

FIG. 2 illustrates a block diagram depicting the relationship of a ME 200, MF 210, VNF 220 and VNFC 230. The PM data at the VNF level produced by VNFM may be consumed by the NM using the VNF instance identifier (ID) associated with PM measurements to map the data to the ME as MOC. For example, it would be possible to map the virtualized CPU utilization data reported by VNFM for a particular VNF instance to the corresponding ME instance.

The VNFs are composed of VNFCs. While the VNFC level PM data reported by VNFM to EM can be consumed by EM itself (EM typically comes from the same vendor as VNF and therefore may have full knowledge of internal architecture and roles of individual VNFCs), the NM cannot consume the VNFC level PM data directly because there is no direct mapping between ME/MF and VNFC. In addition, even if the relationship between VNF and VNFC instances (i.e., which VNFC instance "belongs" to which VNF instance) may be known to the NM, the actual role of the VNFC and its relationship to the application functionality (i.e., which MF this VNFC supports) is still unknown to the NM.

The VNF PM data related to VR is required by NM; however, based on the existing mechanism, the NM cannot know which MF the received VNF PM data related to VR impacts.

One embodiment is directed to enhancing the VNFC PM collection and delivery by defining a new PM measurement type where the resource (e.g., CPU) utilization can indicate the impacted Managed Functions. According to one alternative, an embodiment is configured to define the performance measurement type for resource utilization at the ME level with sub-counters per MF.

For example, in certain embodiments, the performance measurement type may include mean processor usage and peak processor usage. According to one embodiment, the mean processor usage may have the following characteristics (in the format of measurement definition template of 3GPP TS 32.404): a) Mean processor usage measurement provides the mean usage of each key virtualized CPU during the granularity period. Each network equipment may have more than one virtualized CPU, and each key virtualized CPU is indicated with the associated MF; b) System information (SI); c) Mean processor usage measurement is obtained by sampling at a pre-defined interval the usage of the virtualized CPU and then taking the arithmetic mean for each key virtualized CPU; d) Each measurement is an integer value (Unit: %); e) Represented by variable, EQPT.MeanProcessorUsage.ProcessorID.MF, where ProcessorID identifies the virtualized CPU of this equipment and the format of ProcessorID may be vendor specific, where MF indicates the ManagedFunction that ran on the measured virtualized CPU when it was measured; f) ManagedElement; g) Valid for packet switched traffic; h) Evolved packet system (EPS).

According to an embodiment, the peak processor usage may have the following characteristics (in the format of measurement definition template of 3GPP TS 32.404): a) peak processor usage measurement provides the peak usage of each key virtualized CPU during the granularity period. Each network equipment may have more than one virtualized CPU, and each key virtualized CPU is indicated with the associated MF; b) SI; c) peak processor usage measurement is obtained by sampling at a pre-defined interval the usage of the virtualized CPU and then taking the maximum for each key virtualized CPU; d) Each measurement is an integer value (Unit: %); e) Represented by variable, EQPT-.PeakProcessorUsage.ProcessorID.MF, where ProcessorID identifies the virtualized CPU of this equipment, the format of ProcessorID may be vendor specific, and where MF indicates the ManagedFunction that ran on the measured virtualized CPU when it was measured; f) MMEFunction; g) Valid for packet switched traffic; h) EPS.

In another alternative, an embodiment is configured to define the performance measurement type for resource utilization at the MF level. For this alternative embodiment, the performance measurement type may also include mean processor usage and peak processor usage.

According to one embodiment, the mean processor usage may have the following characteristics (in the format of measurement definition template of 3GPP TS 32.404): a) Mean processor usage measurement provides the mean usage of each key virtualized CPU during the granularity period. Each MF may be supported by more than one virtualized CPU, and each virtualized CPU is measured by a sub-counter; b) SI; c) Mean processor usage measurement is obtained by sampling at a pre-defined interval the usage of the virtualized CPU and then taking the arithmetic mean for each key virtualized CPU; d) Each measurement is an integer value (Unit: %); e) It may be defined by variable, EQPT.MeanProcessorUsage.ProcessorID, where ProcessorID identifies the virtualized CPU of this equipment, the format of ProcessorID may be vendor specific; f) MMEFunction; g) Valid for packet switched traffic; h) EPS.

According to an embodiment, the peak processor usage may have the following characteristics (in the format of measurement definition template of 3GPP TS 32.404): a) Peak processor usage measurement provides the peak usage of each key virtualized CPU during the granularity period. Each network equipment may have more than one virtualized CPU, and each key virtualized CPU is measured by a sub-counter; b) SI; c) Peak processor usage measurement is obtained by sampling at a pre-defined interval the usage of the virtualized CPU and then taking the maximum for each key virtualized CPU; d) Each measurement is an integer value (Unit: %); e) May be defined by variable, EQPT.PeakProcessorUsage.ProcessorID, where ProcessorID identifies the virtualized CPU of this equipment, the format of ProcessorID may be vendor specific; f) MMEFunction; g) Valid for packet switched traffic; h) EPS.

Another embodiment is directed to enhancing NFV by making the VNFC to MF mapping visible to the EM (and VNFM) in a standardized way, e.g., by documenting it in VNFD. This would keep the VNFCs hidden from the NM, but allow resource utilization to be reported per application function (part of the ME).

Figure 3:
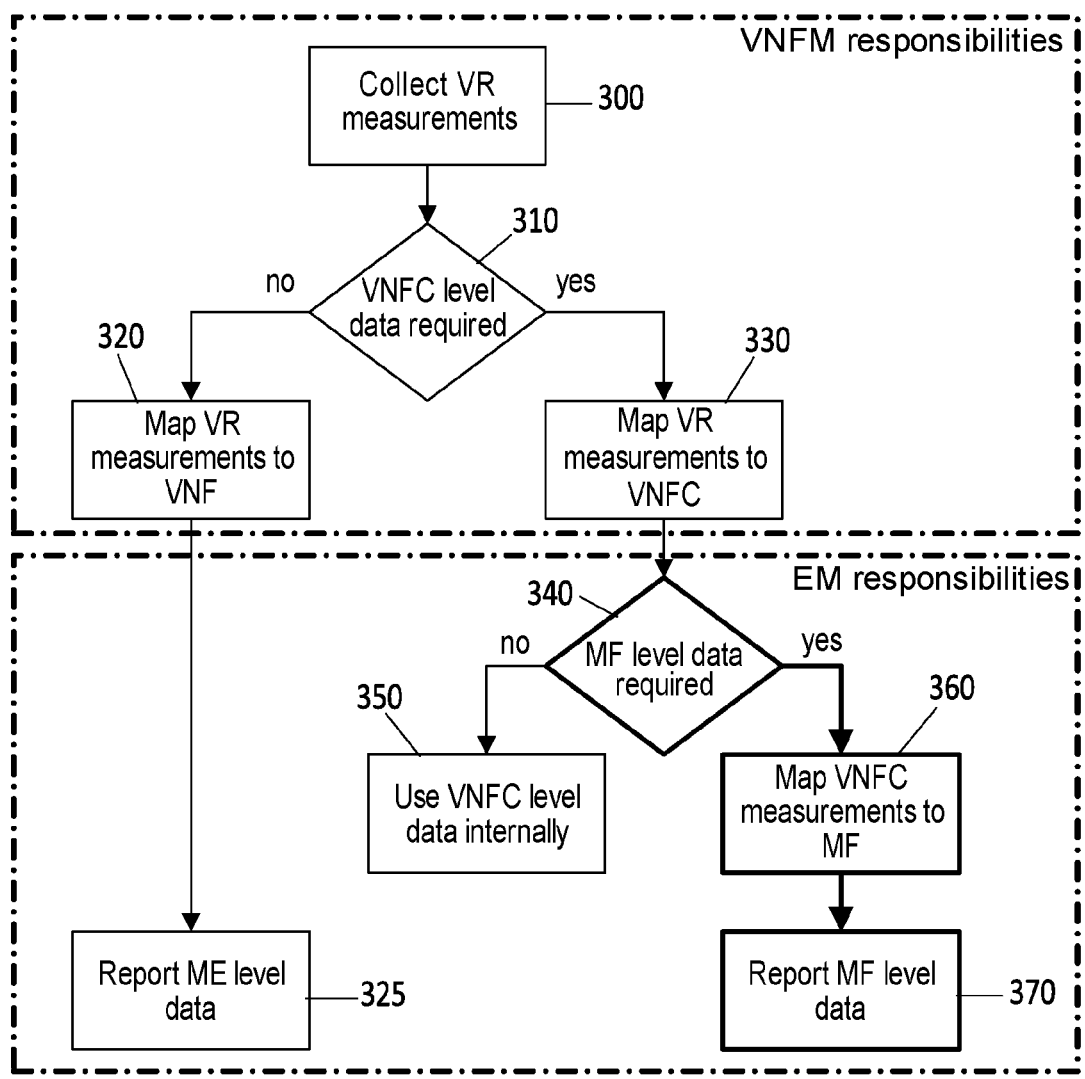
FIG. 3 illustrates an example flow diagram of a method for virtualized resource (VR) performance management (PM) collection, according to an embodiment.

FIG. 3 illustrates an example flow diagram of a method for VR PM collection, according to certain embodiments of the invention. In an embodiment, the method of FIG. 3 may be performed by a network node, such as a VNFM and/or EM. As illustrated in FIG. 3, at 300, the method may include collecting VR measurements and, at 310, it is determined whether VNFC level data is required. If VNFC level data is not required, then the method may include, at 320, mapping VR measurements to VNF and, at 325, reporting the ME level data. If VNFC level data is required, then the method may include, at 330, mapping VR measurements to VNFC and, at 340, determining whether MF level data is required. If MF level data is not required, then the method may include, at 350, using VNFC level data internally. If MF level data is required, then the method may include, at 360, mapping VNFC measurements to MF and, at 370, reporting the MF level data. It is noted that, although FIG. 3 depicts blocks 340, 360 and 370 as being "EM responsibilities", these blocks could alternatively be performed by a VNFM.

Figure 4A:
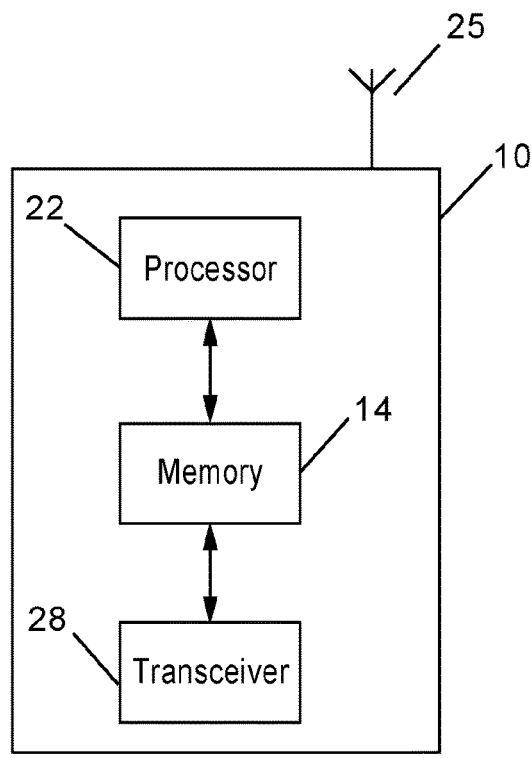
FIG. 4a illustrates a block diagram of an apparatus, according to one embodiment.

FIG. 4a illustrates an example of an apparatus 10 according to an embodiment. In an embodiment, apparatus 10 may be a node, host, or server in a communications network or serving such a network. In an embodiment, apparatus 10 may be a virtualized apparatus. For example, in certain embodiments, apparatus 10 may be one or more of an element manager, a network manager (e.g., a network manager within an operations support system), and/or a virtualized network function manager, as shown in FIG. 1, or may be any combination of these functional elements. For example, in certain embodiments, apparatus 10 may include a combined element manager and virtualized network function manager in a single node or apparatus. However, in other embodiments, apparatus 10 may be other components within a radio access network or other network infrastructure. It should be noted that one of ordinary skill in the art would understand that apparatus 10 may include components or features not shown in FIG. 4a.

As illustrated in FIG. 4a, apparatus 10 may include a processor 22 for processing information and executing instructions or operations. Processor 22 may be any type of general or specific purpose processor. While a single processor 22 is shown in FIG. 4a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. It should be noted that, in certain embodiments, apparatus 10 may be a virtualized apparatus and processor 22 may be a virtual compute resource.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein. In other embodiments, memory 14 may be part of virtualized compute resource or virtualized storage resource.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly. In some embodiments, transceiver 28 may be comprised of virtualized network resources.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources. As mentioned above, in certain embodiments, processor 22 may be a virtualized compute resource that is capable of performing functions associated with virtualized network resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be or may act as an element manager (EM), a network manager (NM), and/or a virtualized network function manager (VNFM), for example. Alternatively, apparatus 10 may be any combination of these functional elements. For example, in certain embodiments, apparatus 10 may be a combined EM and VNFM. According to certain embodiments, a network function may be decomposed into smaller blocks or parts of application, platform, and resources. The network function may be at least one of a physical network function or a virtualized network function.

According to one embodiment, apparatus 10 may be or may act as a VNFM, such as VNFM 103, as illustrated in FIG. 1 discussed above. In an embodiment, apparatus 10 may be controlled by memory 14 and processor 22 to collect virtualized resources measurements, to identify virtualized network function components (e.g., virtual machines or virtualization containers) that the virtualized resources measurements belong to, and to associate the collected virtualized resources measurements with an application function (MF). In an embodiment, apparatus 10 may be further controlled by memory 14 and processor 22 to associate the collected virtualized resources measurements with the application function based on a mapping declared in a template file (VNFD). In another embodiment, apparatus 10 may be further controlled by memory 14 and processor 22 to associate the collected virtualized resources measurements with the application function based on proprietary knowledge. In some embodiments, the collecting of the virtualized resources measurements, the identifying of the virtualized network function components that the virtualized resources measurements belong to, and the associating of the collected virtualized resources measurements with an application function (MF), are all performed by the same entity. In other embodiments, the collecting of the virtualized resources measurements and the identifying of the virtualized network function components that the virtualized resources measurements belong to are performed by one entity, but the associating of the collected virtualized resources measurements with an application function (MF) is performed by another entity.

Figure 4B:
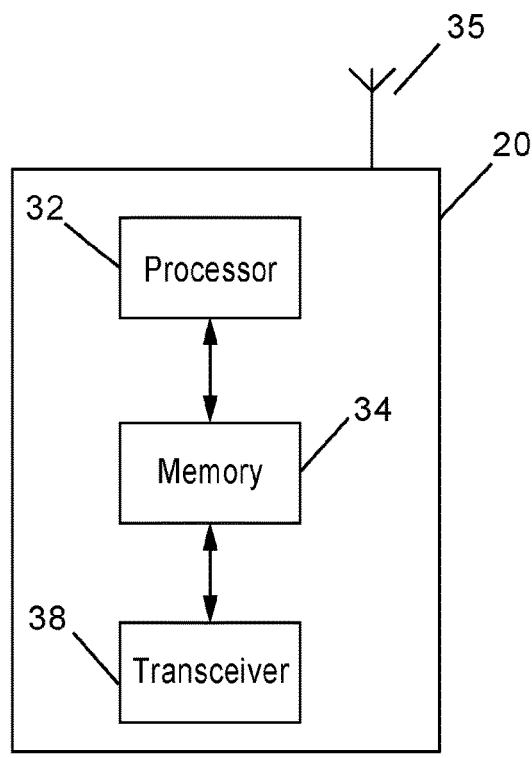
FIG. 4b illustrates a block diagram of an apparatus, according to another embodiment.

FIG. 4b illustrates an example of an apparatus 20 according to another embodiment. In an embodiment, apparatus 20 may be a node, element, or entity in a communications network or associated with such a network. In an embodiment, apparatus 20 may be a virtualized apparatus. For example, in certain embodiments, apparatus 20 may be one or more of an element manager, a network manager (e.g., a network manager within an operations support system), and/or a virtualized network function manager, as shown in FIG. 1, or may be any combination of these functional elements. For example, in certain embodiments, apparatus 20 may include a combined element manager and virtualized network function manager in a single node or apparatus. However, in other embodiments, apparatus 20 may be other components within a radio access network or other network infrastructure. It should be noted that one of ordinary skill in the art would understand that apparatus 20 may include components or features not explicitly shown in FIG. 4b.

As illustrated in FIG. 4b, apparatus 20 includes a processor 32 for processing information and executing instructions or operations. Processor 32 may be any type of general or specific purpose processor. While a single processor 32 is shown in FIG. 4b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. It should be noted that, in certain embodiments, apparatus 20 may be a virtualized apparatus and processor 32 may be a virtual compute resource.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein. In other embodiments, memory 34 may be part of virtualized compute resource or virtualized storage resource.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly. In some embodiments, transceiver 38 may be comprised of virtualized network resources.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources. As mentioned above, in certain embodiments, processor 32 may be a virtualized compute resource that is capable of performing functions associated with virtualized network resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

In certain embodiments, apparatus 20 may be or may act as an element manager (EM), a network manager (NM), and/or a virtualized network function manager (VNFM), for example. Alternatively, apparatus 20 may be any combination of these functional elements. For example, in certain embodiments, apparatus 20 may be a combined EM and VNFM.

According to one embodiment, apparatus 20 may be or may act as an element manager (EM), such as EM 106 illustrated in FIG. 1. According to an embodiment, apparatus 20 may be controlled by memory 34 and processor 32 to report a virtualized resources utilization at Managed Element level as a performance counter, and to report the virtualized resources utilization at Managed Function level as sub-counters. In one embodiment, the virtualized resources utilization at Managed Function level is reported as performance counter.

In view of the above, embodiments of the invention are able to achieve several advantages and/or technical improvements. For example, embodiments may enable new features and functionality, and may result in improved CPU utilization and speed. As a result, embodiments result in more efficient network services, which may include technical improvements such as reduced overhead and increased speed.

In some embodiments, the functionality of any of the methods, processes, or flow charts described herein may be implemented by software and/or computer program code or portions of code stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, objects, functions, applets and/or macros, may be stored in any apparatus-readable data storage medium and may include program instructions to perform particular tasks.

A computer program product may comprise one or more computer-executable components which, when the program is run, are configured to carry out embodiments of the invention. The one or more computer-executable components may be at least one software code or portions of it. Modifications and configurations required for implementing functionality of an embodiment may be performed as routine (s), which may be implemented as added or updated software routine(s). Software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, or software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, or a non-tangible means, that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
collecting, by a network manager, virtualized resources measurements from one or more network elements, wherein the collected virtualized resources measurements comprise mean processor usage;
identifying virtualized network function components that the virtualized resources measurements belong to; and
associating the collected virtualized resources measurements with an application function that is impacted by a result of the virtualized resources measurements; and
controlling a network function virtualization infrastructure based on the association between the collected virtualized resources measurements and the application function in order to improve utilization of the virtualized resources,
wherein the associating of the collected virtualized resources measurements with the application function is performed based on proprietary knowledge, wherein the proprietary knowledge comprises an identifier representing the application function and contained as an attribute in the virtualized resources measurements, and wherein the identifier representing the application function is configured to map virtualized central processing unit utilization data to a corresponding managed element instance, wherein the collected virtualized resources measurements comprise peak processor usage, wherein the mean processor usage provides mean usage of each virtualized central processing unit during a predetermined period, and wherein the peak processor usage provides peak usage of each virtualized central processing unit during a predetermined period.

2. The method according to claim 1, wherein the collecting of the virtualized resources measurements and the identifying of the virtualized network function components that the virtualized resources measurements belong to are performed by one entity; and the associating of the collected virtualized resources measurements with an application function (MF) is performed by another entity.

3. An apparatus, comprising:

at least one processor; and at least one memory including computer program code, wherein the at least one memory and computer program code are configured, with the at least one processor, to cause the apparatus at least to collect virtualized resources measurements from one or more network elements, wherein the collected virtualized resources measurements comprise mean processor usage;

identify virtualized network function components that the virtualized resources measurements belong to; and associate the collected virtualized resources measurements with an application function that is impacted by a result of the virtualized resources measurements in order to improve utilization of the virtualized resources; and control a network function virtualization infrastructure based on the association between the collected virtualized resources measurements and the application function, wherein the associating of the collected virtualized resources measurements with the application function is performed based on proprietary knowledge, wherein the proprietary knowledge comprises an identifier representing the application function and contained as an attribute in the virtualized resources measurements, and wherein the identifier representing the application function is configured to map virtualized central processing unit utilization data to a corresponding managed element instance, wherein the collected virtualized resources measurements comprise peak processor usage, wherein the mean processor usage provides mean usage of each virtualized central processing unit during a predetermined period, and wherein the peak processor usage provides peak usage of each virtualized central processing unit during a predetermined period.

4. A computer program embodied on a non-transitory computer readable medium, the computer program configured to control a processor to perform a process according to claim 1.

* * * * *